US012649872B2

(12) United States Patent
Lee et al.

(10) Patent No.: US 12,649,872 B2
(45) Date of Patent: Jun. 9, 2026

(54) ADHESIVE FILM, OPTICAL MEMBER COMPRISING THE SAME, AND OPTICAL DISPLAY APPARATUS COMPRISING THE SAME

(71) Applicant: SAMSUNG SDI CO., LTD., Yongin-si (KR)

(72) Inventors: Jung Hyo Lee, Suwon-si (KR); Won Kim, Suwon-si (KR); Tae Ji Kim, Suwon-si (KR); Oh Hyeon Hwang, Suwon-si (KR); Il Jin Kim, Suwon-si (KR); Dong Heon Yun, Suwon-si (KR); Ji Hye Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/701,515

(22) Filed: Mar. 22, 2022

(65) Prior Publication Data

US 2022/0306911 A1 Sep. 29, 2022

(30) Foreign Application Priority Data

Mar. 23, 2021 (KR) ........................ 10-2021-0037617

(51) Int. Cl.
*G02F 1/00* (2006.01)
*C08K 3/24* (2006.01)
(Continued)

(52) U.S. Cl.
CPC ............. *C09J 133/066* (2013.01); *C08K 3/24* (2013.01); *C08K 5/0025* (2013.01); *C08K 5/07* (2013.01);
(Continued)

(58) Field of Classification Search
None
See application file for complete search history.

(56) References Cited

U.S. PATENT DOCUMENTS 5,814,685 A * 9/1998 Satake ................ C09D 11/326 525/902
7,070,051 B2 * 7/2006 Kanner ........... A61B 17/06133 206/460
(Continued)

FOREIGN PATENT DOCUMENTS

CN 107418481 A 12/2017
CN 110072959 A 7/2019
(Continued)

OTHER PUBLICATIONS

Machine translation of JP 2019/065113 A (Year: 2019).*
(Continued)

*Primary Examiner* — Frank D Ducheneaux
(74) *Attorney, Agent, or Firm* — Womble Bond Dickinson (US) LLP

(57) ABSTRACT

An adhesive film, an optical member including the same, and an optical display apparatus including the same are provided. An adhesive film is formed of an adhesive composition including a (meth)acrylic copolymer, a curing agent, an aromatic group-containing mono- or higher functional monomer, and an initiator, and has a peel strength increase rate of 5.0 or more, as calculated according to Equation 1 herein.

19 Claims, 2 Drawing Sheets

(51) Int. Cl.

| | |
|---|---|
| ***C08K 5/00*** | (2006.01) |
| ***C08K 5/07*** | (2006.01) |
| ***C08K 5/107*** | (2006.01) |
| ***C08K 5/29*** | (2006.01) |
| ***C09J 4/00*** | (2006.01) |
| ***C09J 7/22*** | (2018.01) |
| ***C09J 133/06*** | (2006.01) |
| ***C09J 133/08*** | (2006.01) |

(52) U.S. Cl.

CPC ................ *C08K 5/107* (2013.01); *C08K 5/29* (2013.01); *C09J 4/00* (2013.01); *C09J 7/22* (2018.01); *C09J 133/064* (2013.01); *C09J 133/08* (2013.01); *G02F 1/00* (2013.01); *C09J 2203/318* (2013.01); *C09J 2301/312* (2020.08); *C09J 2301/408* (2020.08); *C09J 2433/00* (2013.01); *G02F 2201/50* (2013.01)

(56) References Cited

U.S. PATENT DOCUMENTS

| | | | | |
|---|---|---|---|---|
| 7,341,821 | B2 | 3/2008 | Sonokawa | |
| 9,816,685 | B2 * | 11/2017 | Kim | C09J 4/00 |
| 2014/0158300 | A1 * | 6/2014 | Hayata | C03B 19/00 156/345.3 |
| 2014/0205827 | A1 | 7/2014 | Mun et al. | |
| 2016/0115355 | A1 * | 4/2016 | Kim | B32B 27/308 525/219 |
| 2017/0166786 | A1 * | 6/2017 | Moon | C08F 265/06 |
| 2019/0086841 | A1 | 3/2019 | Honya et al. | |
| 2020/0347269 | A1 | 11/2020 | Kim et al. | |
| 2021/0087435 | A1 | 3/2021 | Kang et al. | |

FOREIGN PATENT DOCUMENTS

| | | | | |
|---|---|---|---|---|
| CN | 110713804 | A | 1/2020 | |
| CN | 111094483 | A | 5/2020 | |
| CN | 111133070 | A | 5/2020 | |
| CN | 111770975 | A | 10/2020 | |
| EP | 3750965 | A1 | 12/2020 | |
| JP | 2005317523 | A * | 11/2005 | |
| JP | 2012-184322 | A | 9/2012 | |
| JP | 2014032270 | A * | 2/2014 | |
| JP | 5683369 | B | 3/2015 | |
| JP | 2019065113 | A * | 4/2019 | C09J 11/06 |
| JP | 2020-132658 | A | 8/2020 | |
| JP | 2020-186330 | A | 11/2020 | |
| KR | 2020-0012451 | A | 2/2020 | |
| KR | 2020-0062255 | A | 6/2020 | |
| KR | 10-2024-039838 | A | 3/2024 | |
| WO | WO 2017/171084 | A | 10/2017 | |
| WO | WO 2020/022859 | A1 | 1/2020 | |

OTHER PUBLICATIONS

Aldrich Data Sheet (Year: 2019).*
Machine translation of JP 2014032270 A (Year: 2014).*
https://pubchem.ncbi.nlm.nih.gov/compound/2-Phenoxyethyl-acrylate (Year: 2025).*
https://pubchem.ncbi.nlm.nih.gov/compound/Nonylphenol-ethylene-oxide (Year: 2025).*
https://www.sigmaaldrich.com/US/en/product/aldrich/408336?srsltid=AfmBOoqjKSnf-6_iBzp2TegbF0iHz8NtJqAJkZiX2P0-E6Taw4hPIC1q (Year: 2025).*
Machine translation of JP_2005317523_A_I (Year: 2005).*
Chinese Office Action dated Jun. 5, 2023, issued in corresponding Chinese Patent Application No. 202210290613.8 (6 pages).
“Butylacrylate”, Arkeman, https://www.arkema.com/usa/en/product/acrylics/butylacrylate/#:-:text=Butylacrylate%20is%20a%20colorless%20liquid,C%20(%2D65%C2%BOF), accessed Oct. 4, 2023.
Chinese Office Action dated Jul. 17, 2023 issued in corresponding Chinese Patent Application No. 202210289639.0 (7 pages).
Chinese Office Action dated Jul. 21, 2023, issued in corresponding Chinese Patent Application No. 202210289636.7 (7 pages).
Japanese Office Action dated Jan. 24, 2023 issued in corresponding Japanese Patent Application No. 2022-047093 (5 pages).
Japanese Office Action dated Jan. 24, 2023 issued in corresponding Japanese Patent Application No. 2022-047088 (5 pages).
JP 2012-184322 English Machine Translation.
Korean Office Action dated May 4, 2023, issued in corresponding Korean Patent Application No. 10-2021-0037616 (6 pages).
Korean Office Action dated May 4, 2023, issued in corresponding Korean Patent Application No. 10-2021-0037615 (7 pages).
US Office Action dated Apr. 20, 2023, issued in U.S. Appl. No. 17/701,462 (10 pages).
US Office Action dated Oct. 19, 2023, issued in U.S. Appl. No. 17/701,456 (16 pages).
US Final Office Action dated Nov. 6, 2023, issued in U.S. Appl. No. 17/701,462 (10 pages).
Machine translation of KR 2024039838 A (Year: 2024).
US Office Action dated Jun. 13, 2024, issued in U.S. Appl. No. 17/701,462 (11 pages).
US Final Office Action dated Jun. 18, 2024, issued in U.S. Appl. No. 17/701,456 (16 pages).
US Final Office Action dated Dec. 24, 2024, issued in U.S. Appl. No. 17/701,462 (10 pages).
US Office Action dated Feb. 11, 2025, issued in U.S. Appl. No. 17/701,456 (16 pages).
Data Sheet for Aronix M-101A (Year: 2025).
US Office Action dated Apr. 10, 2025, issued in U.S. Appl. No. 17/701,462 (12 pages).
US Office Action dated May 22, 2025, issued in U.S. Appl. No. 17/701,456 (10 pages).
US Notice of Allowance dated Nov. 17, 2025, issued in U.S. Appl. No. 17/701,462 (12 pages).

* cited by examiner

ADHESIVE FILM, OPTICAL MEMBER COMPRISING THE SAME, AND OPTICAL DISPLAY APPARATUS COMPRISING THE SAME

CROSS-REFERENCE TO RELATED APPLICATION

This application claims priority to and the benefit of Korean Patent Application No. 10-2021-0037617, filed on Mar. 23, 2021 in the Korean Intellectual Property Office, the entire disclosure of which is incorporated herein by reference.

BACKGROUND

1. Field

Aspects of embodiments of the present invention relate to an adhesive film, an optical member including the same, and an optical display apparatus including the same.

2. Description of the Related Art

In recent years, optical displays using organic light emitting diodes (OLED) have been developed. In particular, an optical display based on flexible organic light emitting diodes has been spotlighted in the art.

A flexible panel based on flexible organic light emitting diodes includes a plastic film, such as a polyimide film and the like, on each of upper and lower sides of the panel. The flexible panel is more flexible than a liquid crystal panel and a typical organic light emitting diode-based panel. Accordingly, a protective film for processes is temporarily adhered to the flexible panel to protect the flexible panel or to prevent or substantially prevent occurrence of scratches on the flexible panel during a process of processing, assembling and/or inspecting the flexible panel. When it is determined through inspection of the flexible panel that there is a defect, such as abnormal appearance or foreign matter, it is desirable for the protective film to have low peel strength in order to be easily removed from the flexible panel. After inspection of the flexible panel, a protective film for reinforcement is adhered to the flexible panel in order to support the panel while protecting the panel from external environments. Therefore, the protective film for reinforcement is desired to have higher peel strength and reliability than the protective film for processes.

However, in a typical panel manufacturing process, a process of assembling a temporary protective film for processes to a panel, a process of peeling off the temporary protective film of the panel, and a process of assembling a protective film for reinforcement to the panel must be sequentially performed, thereby complicating the manufacturing process. Moreover, since the protective film for processes must be discarded after the peeling process, there is a problem of deterioration in economic efficiency and environmental friendliness.

The background technique of the present invention is disclosed in JP Patent Registration No. 5,683,369 and the like.

SUMMARY

According to an aspect of one or more embodiments of the present invention, an adhesive film is provided that can be easily removed from an optical member after attachment of the adhesive film thereto and can be secured to the optical member through a process (e.g., a predetermined process).

According to another aspect of one or more embodiments of the present invention, an adhesive film is provided that can be adhered at low peel strength to an adherend before irradiation with light to provide temporary protection to the adherend and can be easily removed therefrom without deformation and/or damage to the adherend through selective cutting of an unnecessary portion of the adhesive film.

According to another aspect of one or more embodiments of the present invention, an adhesive protective film is provided that exhibits significant increase in peel strength after irradiation with light, as compared with peel strength before irradiation with light, and is secured to an adherend to improve durability of an optical member including the adherend.

According to another aspect of one or more embodiments of the present invention, an adhesive film is provided that can be easily removed from an optical member due to a low peel strength increase rate even after a long period of time has elapsed after attachment of the adhesive film to the adherend.

According to another aspect of one or more embodiments of the present invention, an adhesive film is provided that has good wettability on a surface of an adherend.

Aspects of one or more embodiments of the present invention relate to an adhesive film.

According to one or more embodiments, an adhesive film is formed of an adhesive composition including a (meth) acrylic copolymer, a curing agent, an aromatic group-containing mono- or higher functional monomer, and an initiator, and has a peel strength increase rate of 5.0 or more, as calculated by the following Equation 1:

$$\text{Peel strength increase rate}=P2/P1,$$

where P1 is an initial peel strength (unit: gf/inch) of the adhesive film with respect to an adherend, as measured on a specimen of the adhesive film and the adherend, and P2 is a peel strength of the adhesive film (unit: gf/inch) with respect to the adherend, as measured on the specimen of the adhesive film and the adherend after irradiation of the specimen with light.

According to one or more embodiments, an adhesive film is formed of an adhesive composition including a (meth) acrylic copolymer, a curing agent, an aromatic group-containing mono- or higher functional monomer, and an initiator, and has an initial peel strength of greater than 0 gf/inch to about 100 gf/inch with respect to an adherend, as measured on a specimen of the adhesive film and the adherend, and a peel strength of 300 gf/inch or more with respect to the adherend, as measured on the specimen of the adhesive film and the adherend after irradiation of the specimen with light.

In one or more embodiments, P1 may be greater than 0 gf/inch and less than or equal to about 100 gf/inch.

In one or more embodiments, P2 may be about 300 gf/inch or more.

In one or more embodiments, the adhesive film may have a storage modulus of 50 kPa or less at 25° C.

In one or more embodiments, the adhesive film may have a peel strength increase rate of 0.7 or less, as calculated by the following Equation 2:

$$\text{Peel strength increase rate}=(P3-P1)/P1,$$

where P1 is an initial peel strength (unit: gf/inch) of the adhesive film with respect to an adherend, as measured on a specimen of the adhesive film and the adherend, and P3 is a peel strength of the adhesive film (unit: gf/inch) with respect to the adherend, as measured on the specimen of the adhesive film and the adherend after the specimen is left at 25° C. and at 50% relative humidity (RH) for 7 days.

In one or more embodiments, the aromatic group-containing mono- or higher functional monomer may have a higher glass transition temperature in a homopolymer phase than a glass transition temperature of the (meth)acrylic copolymer.

In one or more embodiments, a difference between a glass transition temperature of the aromatic group-containing mono- or higher functional monomer in a homopolymer phase and a glass transition temperature of the (meth)acrylic copolymer may be about 20° C. or more.

In one or more embodiments, the aromatic group-containing mono- or higher functional monomer may have a glass transition temperature of about −20° C. or more in a homopolymer phase.

In one or more embodiments, the aromatic group-containing mono- or higher functional monomer may include a compound of the following Formula 1:

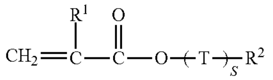

where $R^1$ is hydrogen or a methyl group; s is an integer of 0 to 10; $R^2$ is a substituted or unsubstituted $C_6$ to $C_{50}$ aryl group or a substituted or unsubstituted $C_6$ to $C_{50}$ aryloxy group; and T is a substituted or unsubstituted $C_1$ to $C_6$ alkylene group or a substituted or unsubstituted $C_1$ to $C_6$ alkyleneoxy group.

In one or more embodiments, the aromatic group-containing mono- or higher functional monomer may be present in an amount of about 30 parts by weight to about 150 parts by weight relative to 100 parts by weight of the (meth) acrylic copolymer.

In one or more embodiments, the (meth)acrylic copolymer may have a glass transition temperature Tg of about −10° C. or less.

In one or more embodiments, the (meth)acrylic copolymer may include a copolymer of a monomer mixture including an alkyl group-containing (meth)acrylic monomer and a hydroxyl group-containing (meth)acrylic monomer, and the hydroxyl group-containing (meth)acrylic monomer may be present in an amount of about 0.1 mol % to about 10 mol % in the monomer mixture.

In one or more embodiments, the monomer mixture may include a (meth)acrylic monomer having a glass transition temperature of about −80° C. or more in a homopolymer phase.

In one or more embodiments, the monomer mixture may further include a carboxylic acid group-containing monomer.

In one or more embodiments, the curing agent may include a mixture of an isocyanate curing agent and a metal chelate curing agent.

In one or more embodiments, the initiator may include at least one selected from among a photo-radical initiator and a photo-cationic initiator.

In one or more embodiments, the adhesive composition may include 100 parts by weight of the (meth)acrylic copolymer, about 0.01 parts by weight to about 8 parts by weight of the curing agent, about 30 parts by weight to about 150 parts by weight of the aromatic group-containing mono- or higher functional monomer, and about 0.03 parts by weight to about 7.5 parts by weight of the initiator.

According to one or more embodiments of the present invention, an optical member includes a flexible panel and the adhesive film according to an embodiment of the present invention stacked on at least one surface of the flexible panel.

According to one or more embodiments of the present invention, an optical display apparatus includes the adhesive film according to an embodiment of the present invention.

DETAILED DESCRIPTION

Figure 1A:
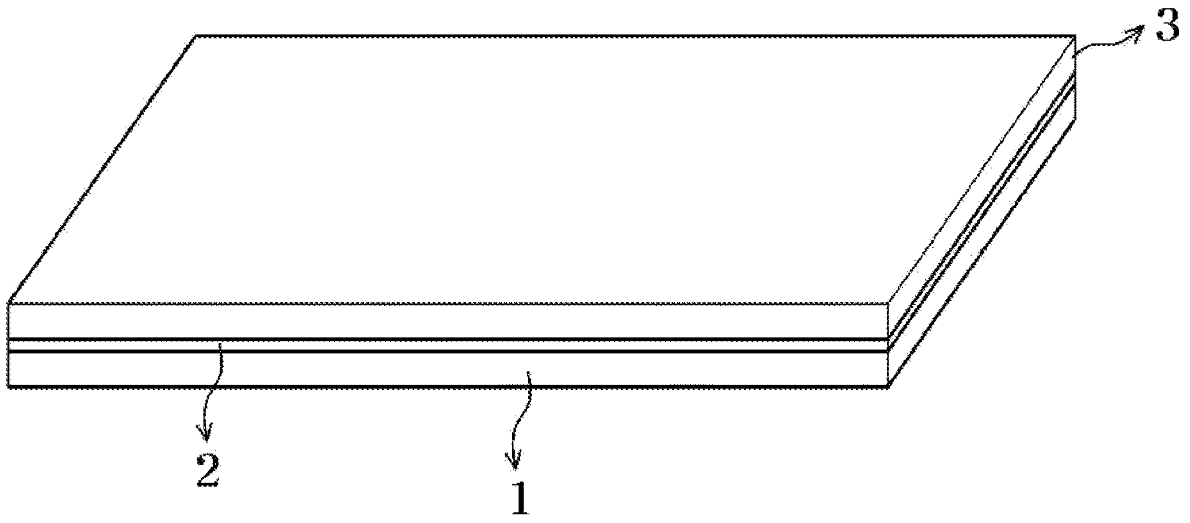
FIG. 1A is a view of a specimen for measurement of T-peel strength.

Herein, some embodiments of the present invention will be described in further detail. However, it is to be understood that the present invention is not limited to the following embodiments and may be embodied in different ways. The following embodiments are provided to provide a thorough understanding of the invention to those skilled in the art.

Herein, "(meth)acryl" refers to acryl and/or methacryl.

Herein, "copolymer" may include a polymer or a resin.

Herein, "glass transition temperature" may refer to a glass transition temperature (Tg) measured on a target compound using a DSC Discovery (TA Instruments). Specifically, a homopolymer of a target monomer is heated to about 180° C. at a heating rate of about 20° C./min, is slowly cooled to about −100° C., and is heated again to about 100° C. at a heating rate of 10° C./min to obtain data of an endothermic transition curve. An inflection point of the endothermic transition curve may be defined as the glass transition temperature of a target monomer in a homopolymer phase.

Herein, "storage modulus" is a value measured using a dynamic viscoelasticity measurement device (Rheometer, Anton Paar Co., Ltd.) at a shear rate of 1 rad/sec, a strain of 1%, and a frequency of 1 Hz under auto strain conditions in a temperature sweep test mode. Specifically, multiple adhesive films are stacked to form a laminate having a thickness of 800 μm, which, in turn, is punched using an 8 mm-diameter punching machine to prepare a specimen. Then, with a normal force of 3 N applied to the specimen using 8 mm jigs, storage modulus is measured at 25° C. on the specimen while heating the specimen from −50° C. to 100° C. at a heating rate of 5° C./min.

As used herein to represent a specific numerical range, the expression "X to Y" means a value greater than or equal to X and less than or equal to Y (X and Y).

An adhesive film according to embodiments of the present invention is an adhesive film having low peel strength (initial peel strength) and not subjected to irradiation with light. The adhesive film according to embodiments of the present invention exhibits a suitable range of peel strength before irradiation with light. Thus, the adhesive film can be adhered at low peel strength to an adherend to provide temporary protection to the adherend and can be easily removed therefrom without deformation and/or damage to the adherend. In terms of this feature, the adhesive film according to embodiments of the present invention is distinguished from a coat for formation of an adhesive film, which exhibits no peel strength before irradiation with light upon formation of the adhesive film using a typical photocurable adhesive composition, in which the coat does not have a function of temporarily protecting the adherend.

In an embodiment, the adhesive film according to the present invention has an initial peel strength of greater than 0 gf/inch to about 100 gf/inch, and, in an embodiment, 0.1 gf/inch, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, for example, about 10 gf/inch to about 100 gf/inch, about 20 gf/inch to about 70 gf/inch, or about 30 gf/inch to about 70 gf/inch. The initial peel strength may be realized by an adhesive composition including a (meth)acrylic copolymer, a curing agent, an aromatic group-containing mono- or higher functional monomer, and an initiator. These components will be described in further detail below.

The adhesive film according to embodiments of the present invention exhibits significant increase in peel strength after irradiation with light, as compared with peel strength before irradiation with light. Accordingly, the adhesive film according to embodiments of the present invention can achieve both temporary protection and permanent protection with respect to an adherend and can be used as a temporary protective film for processes and a protective film for reinforcement, thereby enabling process simplification, economic feasibility, and environmental friendliness. The temporary protective film for processes may be a film that is temporarily adhered to the adherend and then removed therefrom to temporarily protect the adherend. The protective film for reinforcement may be a film that is permanently adhered to the adherend to protect the adherend from external environments and is not removed from the adherend.

The adhesive film according to embodiments of the present invention can be used as a protective film for reinforcement. The protective film for reinforcement refers to a protective film that is stacked on at least one surface of a flexible panel and protects the flexible panel from external impact.

Herein, “adherend” refers to a plastic film, for example, a polyimide film, a polycarbonate film, a polyester film, such as a polyethylene naphthalate film, a polyethylene terephthalate film, and the like, a polyether sulfone film, and a polyurethane film. In an embodiment, the adherend is a polyimide film.

The polyimide film is a polymer film prepared through polymerization of a polyamic acid acting as a precursor and containing an imide group and an aromatic group in a repeat unit, and has good mechanical properties to be broadly used as a substrate of a flexible OLED panel.

Herein, an adhesive film according to embodiments of the present invention will be described.

The adhesive film according to embodiments of the present invention (herein referred to as “adhesive film”) has a peel strength increase rate of 5.0 or more, as calculated by the following Equation 1. Within this range, the adhesive film can be adhered to an adherend with high peel strength and high reliability after irradiation with light to provide effective protection effect with respect to the adherend:

$$\text{Peel strength increase rate}=P2/P1, \quad \text{Equation 1}$$

where P1 is an initial peel strength (unit: gf/inch) of the adhesive film with respect to an adherend, as measured on a specimen of the adhesive film and the adherend, and P2 is a peel strength of the adhesive film (unit: gf/inch) with respect to the adherend, as measured on the specimen of the adhesive film and the adherend after irradiation of the specimen with light.

In an embodiment, the peel strength increase rate of Equation 1 is in a range of about 5.0 to about 30, and, in an embodiment, 5, 6, 7, 8, 9, 10, 11, 12, 13, 14, 15, 16, 17, 18, 19, 20, 21, 22, 23, 24, 25, 26, 27, 28, 29, or 30, and, in an embodiment, about 8.0 to about 30. Within this range, the adhesive film can easily secure initial peel strength and peel strength after irradiation with light.

In an embodiment, the adhesive film may have a P1 value (initial peel strength) of greater than 0 gf/inch to about 100 gf/inch, and, in an embodiment, 0.1 gf/inch, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, for example, about 10 gf/inch to about 100 gf/inch, about 20 gf/inch to about 70 gf/inch, or about 30 gf/inch to about 70 gf/inch. Within this range, the adhesive film can be easily removed from an adherend without deformation and/or damage to the adherend and allows easy increase in peel strength after irradiation with light.

In an embodiment, the adhesive film may have a P2 value of about 300 gf/inch or more, and, in an embodiment, 300 gf/inch, 350 gf/inch, 400 gf/inch, 450 gf/inch, 500 gf/inch, 550 gf/inch, 600 gf/inch, 650 gf/inch, 700 gf/inch, 750 gf/inch, 800 gf/inch, 850 gf/inch, 900 gf/inch, 950 gf/inch, or 1,000 gf/inch, for example, about 300 gf/inch to about 1,000 gf/inch, or about 300 gf/inch to about 950 gf/inch. Within this range, the adhesive film can be adhered to an adherend with high peel strength and high reliability, thereby providing effective protection to the adherend.

Here, P2 is a value measured on a specimen of the adhesive film and the adherend after irradiation with light. According to embodiments of the present invention, despite physical change of the adhesive film due to increase in cohesive strength and/or modulus of the adhesive film after irradiation with light and despite curing of the mono- or higher functional monomer by irradiation with light, shrinkage of the adhesive film is suppressed to increase peel strength of the adhesive film after irradiation with light. In general, when the mono- or higher functional monomer is cured by irradiation with light, a typical adhesive film suffers from deterioration in peel strength through curing shrinkage, whereas shrinkage of the adhesive film according to embodiments of the present invention is suppressed even after irradiation with light. This feature will be described in further detail below.

Herein, “irradiation with light” may include irradiation of the adhesive film with light having a wavelength of about 280 nm to about 430 nm, for example, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, or 430 nm, and, in an embodiment, in the range of about 350 nm to about 390 nm, and at a dose of about 1,000 mJ/cm$^2$. UV irradiation may be performed using at least one of a UV LED, a high pressure mercury lamp, and a metal halide lamp.

In an embodiment, the adhesive film may have a storage modulus of about 50 kPa or less at 25° C., and, in an embodiment, 1 kPa, 5 kPa, 10 kPa, 15 kPa, 20 kPa, 25 kPa, 30 kPa, 35 kPa, 40 kPa, 45 kPa, or 50 kPa, for example, about 1 kPa to about 50 kPa, or about 5 kPa to about 45 kPa. Within this range, the adhesive film can have a low peel strength of 100 gf/in or less before irradiation with light and can exhibit good wettability with respect to an adherend.

In an embodiment, the adhesive film may have a peel strength increase rate of about 0.7 or less, as calculated by the following Equation 2, before irradiation with light. Within this range, the adhesive film can be easily removed from an adherend due to low peel strength to the adherend even after a long period of time has elapsed after attachment of the adhesive film to the adherend. For example, in an embodiment, the adhesive film has a peel strength increase rate of 0.05, 0.1, 0.15, 0.2, 0.25, 0.3, 0.35, 0.4, 0.45, 0.5, 0.55, 0.6, 0.65, or 0.7, for example, about 0.1 to about 0.7, for example, about 0.2 to about 0.7, as calculated by the following Equation 2:

$$\text{Peel strength increase rate}=(P3-P1)/P1, \qquad \text{Equation 2}$$

where P1 is an initial peel strength (unit: gf/inch) of the adhesive film with respect to an adherend, as measured on a specimen of the adhesive film and the adherend, and P3 is a peel strength of the adhesive film (unit: gf/inch) with respect to the adherend, as measured on the specimen of the adhesive film and the adherend after the specimen is left at 25° C. and at 50% relative humidity (RH) for 7 days.

In an embodiment, the adhesive film may have a P1 value (initial peel strength) of greater than 0 gf/inch to about 100 gf/inch, and, in an embodiment, 0.1 gf/inch, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, for example, about 10 gf/inch to about 100 gf/inch, about 20 gf/inch to about 70 gf/inch, or about 30 gf/inch to about 70 gf/inch. In an embodiment, the adhesive film has a higher P3 value than P1 and has a P3 value of greater than 0 gf/inch to about 100 gf/inch, and, in an embodiment, 0.1 gf/inch, 5 gf/inch, 10 gf/inch, 15 gf/inch, 20 gf/inch, 25 gf/inch, 30 gf/inch, 35 gf/inch, 40 gf/inch, 45 gf/inch, 50 gf/inch, 55 gf/inch, 60 gf/inch, 65 gf/inch, 70 gf/inch, 75 gf/inch, 80 gf/inch, 85 gf/inch, 90 gf/inch, 95 gf/inch, or 100 gf/inch, for example, about 10 gf/inch to about 100 gf/inch, about 20 gf/inch to about 90 gf/inch, or about 30 gf/inch to about 80 gf/inch.

The adhesive film according to embodiments of the present invention is formed of an adhesive composition including a (meth)acrylic copolymer, a curing agent, an aromatic group-containing mono- or higher functional monomer, and an initiator. In an embodiment, the adhesive film may have the aromatic group-containing mono- or higher functional monomer and the initiator, dispersed in a matrix of the adhesive film formed by curing the (meth) acrylic copolymer and the curing agent with heat.

(Meth)acrylic Copolymer

The (meth)acrylic copolymer forms the matrix of the adhesive film and is cured by the curing agent to provide initial peel strength of the adhesive film. After irradiation with light, the (meth)acrylic copolymer can assist in improvement in modulus and cohesive strength of the adhesive film together with the aromatic group-containing mono- or higher functional monomer.

In an embodiment, the (meth)acrylic copolymer may have a glass transition temperature (Tg) of about −10° C. or less. Within this range, the (meth)acrylic copolymer can assist in securing initial peel strength of the adhesive film and can increase peel strength after irradiation with light by suppressing shrinkage of the adhesive film through adjustment of the glass transition temperature, as compared with an oligomer formed of a mono- or higher functional monomer. In an embodiment, the (meth)acrylic copolymer may have a glass transition temperature (Tg) of about −15° C. or less, and, in an embodiment, −70° C., −65° C., −60° C., −55° C., −50° C., −45° C., −40° C., −35° C., −30° C., −25° C., −20° C., or −15° C., for example, about −60° C. to about −20° C. Within this range, the (meth)acrylic copolymer can further improve wettability (adhesive strength) of the adhesive film with respect to an adherend.

In an embodiment, the (meth)acrylic copolymer may have a weight average molecular weight of about 500,000 g/mol or more, and, in an embodiment, 500,000 g/mol, 600,000 g/mol, 700,000 g/mol, 800,000 g/mol, 900,000 g/mol, 1,000,000 g/mol, 1,100,000 g/mol, 1,200,000 g/mol, 1,300,000 g/mol, 1,400,000 g/mol, or 1,500,000 g/mol, for example, about 600,000 g/mol to about 1,500,000 g/mol. Within this range, the (meth)acrylic copolymer can assist in securing wettability (adhesive strength) and initial peel strength of the adhesive film with respect to an adherend.

The (meth)acrylic copolymer may include a copolymer of a monomer mixture including an alkyl group-containing (meth)acrylic monomer and a hydroxyl group-containing (meth)acrylic monomer.

The alkyl group-containing (meth)acrylic monomer serves to form the matrix of the adhesive film and may include an unsubstituted $C_1$ to $C_{20}$ alkyl group-containing (meth)acrylic acid ester. For example, the alkyl group-containing (meth)acrylic monomer may include at least one selected from among methyl (meth)acrylate, ethyl (meth) acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, iso-octyl (meth)acrylate, nonyl (meth)acrylate, decyl (meth)acrylate, and lauryl (meth)acrylate.

In an embodiment, the alkyl group-containing (meth) acrylic monomer may be present in an amount of about 85 mol % to about 99.5 mol %, and, in an embodiment, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, 98 mol %, 99 mol %, or 99.5 mol %, for example, about 90 mol % to about 98 mol %, about 95 mol % to about 99 mol %, in the monomer mixture. Within this range, the adhesive film can exhibit good wettability with respect to an adherend and can secure suitable initial peel strength.

The hydroxyl group-containing (meth)acrylic monomer may be a (meth)acrylate containing at least one hydroxyl group. For example, the hydroxyl group-containing (meth) acrylate may be a (meth)acrylic acid ester containing a $C_1$ to $C_{20}$ alkyl group having at least one hydroxyl group, a (meth)acrylic acid ester containing a $C_5$ to $C_{20}$ cycloalkyl group having at least one hydroxyl group, or a (meth)acrylic acid ester containing a $C_6$ to $C_{20}$ aryl group having at least one hydroxyl group. The hydroxyl group-containing (meth) acrylate may include at least one selected from among 2-hydroxyethyl (meth)acrylate, 3-hydroxypropyl (meth) acrylate, 4-hydroxybutyl (meth)acrylate, hydroxyhexyl (meth)acrylate, 1,4-cyclohexanedimethanol mono(meth) acrylate, 1-chloro-2-hydroxy propyl (meth)acrylate, diethylene glycol mono(meth)acrylate, 1,6-hexanediol mono (meth)acrylate, pentaerythritol tri(meth)acrylate, dipentaerythritol penta(meth)acrylate, neopentyl glycol mono(meth)acrylate, trimethylol propane di(meth)acrylate, trimethylol ethane di(meth)acrylate, 2-hydroxy-3-phenyloxypropyl (meth)acrylate, 4-hydroxycyclopentyl (meth) acrylate, 4-hydroxycyclohexyl (meth)acrylate, and cyclohexane dimethanol mono(meth)acrylate.

In an embodiment, the hydroxyl group-containing (meth) acrylic monomer may be present in an amount of about 0.1 mol % to about 10 mol %, and, in an embodiment, 0.1 mol %, 0.5 mol %, 1 mol %, 1.5 mol %, 2 mol %, 2.5 mol %, 3 mol %, 3.5 mol %, 4 mol %, 4.5 mol %, 5 mol %, 5.5 mol %, 6 mol %, 6.5 mol %, 7 mol %, 7.5 mol %, 8 mol %, 8.5 mol %, 9 mol %, 9.5 mol %, or 10 mol %, for example, about 0.5 mol % to about 10 mol %, and, in an embodiment, about 2 mol % to about 10 mol %, and, in an embodiment, about 1 mol % to about 5 mol %, in the monomer mixture. Within this range, the adhesive composition can impart cohesive strength to an adhesive layer to form the adhesive layer and can secure suitable initial peel strength of the adhesive film.

The monomer mixture may further include a carboxylic acid-containing monomer. The carboxylic acid-containing monomer can assist in securing initial adhesive strength through increase in glass transition temperature of the (meth)acrylic copolymer. The carboxylic acid-containing monomer may include (meth)acrylic acid, without being limited thereto.

In an embodiment, the carboxylic acid-containing monomer may be present in an amount of about 0 mol % to about 5 mol %, and, in an embodiment, 0.05 mol %, 0.1 mol %, 0.5 mol %, 1 mol %, 1.5 mol %, 2 mol %, 2.5 mol %, 3 mol %, 3.5 mol %, 4 mol %, 4.5 mol %, or 5 mol %, for example, about 0.05 mol % to about 5 mol %, and, in an embodiment, about 0.1 mol % to about 5 mol %, in the monomer mixture. Within this range, the adhesive composition can impart cohesive strength to an adhesive layer to form the adhesive layer and can secure suitable initial peel strength of the adhesive film.

In an embodiment, the monomer mixture may include a (meth)acrylic monomer, which has a glass transition temperature of about −80° C. or more and about 0° C. or less, and, in an embodiment, −80° C., −75° C., −70° C., −65° C., −60° C., −55° C., −50° C., −45° C., −40° C., −35° C., −30° C., −25° C., −20° C., −15° C., −10° C., −5° C., or 0° C., for example, about −60° C. to about −20° C., in a homopolymer phase. Within this range, the monomer mixture can easily form a (meth)acrylic copolymer having a glass transition temperature within this above range.

The monomer mixture may include any of methyl acrylate, acrylic acid, and methacrylic acid, without being limited thereto.

In an embodiment, the monomer mixture may be free from an aromatic group-containing monomer. It is difficult for an adhesive film manufactured using a (meth)acrylic copolymer formed of the aromatic group-containing monomer to reach the peel strength increase rate according to Equation 1.

The (meth)acrylic copolymer may be prepared through typical polymerization of the monomer mixture. Polymerization may include a typical method well-known to those skilled in the art. For example, the (meth)acrylic copolymer may be prepared by adding an initiator to the monomer mixture, followed by typical copolymerization, for example, suspension polymerization, emulsion polymerization, solution polymerization, and the like. Polymerization may be performed at about 60° C. to about 70° C. for about 4 hours to about 8 hours. The initiator may include a typical initiator including azo-based polymerization initiators and/or peroxides, such as benzoyl hydroxide or acetyl hydroxide.

Curing Agent

The curing agent can assist in formation of the matrix of the adhesive film through heat curing of the (meth)acrylic copolymer and in securing initial peel strength of the adhesive film.

The curing agent may be a heat curing agent and may include at least one selected from among an isocyanate curing agent, a metal chelate curing agent, a carbodiimide curing agent, an aziridine curing agent, and an epoxy curing agent. In an embodiment, an isocyanate curing agent or a mixture of an isocyanate curing agent and a metal chelate curing agent is used. The mixture of these curing agents allows easy implementation of the advantageous effects of the present invention.

The isocyanate curing agent may include a bi- or higher functional, and, in an embodiment, bi- to hexa-functional isocyanate curing agent. In an embodiment, the isocyanate curing agent may include at least one selected from among xylene diisocyanate (XDI) including m-xylene diisocyanate and the like, methylenebis(phenyl isocyanate) (MDI) including 4,4'-methylenebis(phenyl isocyanate) and the like, naphthalene diisocyanate, toluene diisocyanate, hexamethylene diisocyanate, and isophorone diisocyanate, or adducts thereof. For example, the adducts may include trimethylol propane adducts of toluene diisocyanate, trimethylol propane adducts of hexamethylene diisocyanate, trimethylol propane adducts of isophorone diisocyanate, trimethylol propane adducts of xylene diisocyanate, isocyanurates of toluene diisocyanate, isocyanurates of hexamethylene diisocyanate, and isocyanurates of isophorone diisocyanate. The isocyanate curing agent may include at least one of these compounds.

In an embodiment, the isocyanate curing agent may be present in an amount of about 5 parts by weight or less, and, in an embodiment, 0.001, 0.005, 0.1, 0.5, 1, 1.5, 2, 2.5, 3, 3.5, 4, 4.5, or 5 parts by weight, for example, about 0.001 parts by weight to about 3 parts by weight, and, in an embodiment, about 0.01 parts by weight to about 2 parts by weight, relative to 100 parts by weight of the (meth)acrylic copolymer. Within this range, the adhesive composition can improve reliability of the adhesive film.

The metal chelate curing agent may include a typical metal chelate curing agent. For example, the metal chelate curing agent may be a curing agent containing a metal, such as any of aluminum, iron, copper, zinc, tin, titanium, nickel, antimony, magnesium, vanadium, chromium, and zirconium. For example, the metal chelate curing agent may include at least one selected from among aluminum ethyl acetoacetate diisopropylate, aluminum tris(ethyl acetoacetate), alkyl acetoacetate aluminum diisopropylate, aluminum isopropylate, mono-sec-butoxyaluminum diisopropylate, aluminum-sec-butyrate, aluminum ethylate, tetraisopropyl titanate, tetra-normal butyl titanate, butyl titanate dimer, titanium acetyl acetonate, titanium octylene glycolate, titanium tetra-acetyl acetonate, titanium ethyl acetate, polyhydroxytitanium stearate, and aluminum acetyl acetonate.

In an embodiment, the metal chelate curing agent may be present in an amount of about 3 parts by weight or less, and, in an embodiment, 0.001, 0.005, 0.1, 0.5, 1, 1.5, 2, 2.5, or 3 parts by weight, for example, about 0.001 parts by weight to about 1 part by weight, and, in an embodiment, about 0.01 parts by weight to about 1 part by weight, relative to 100 parts by weight of the (meth)acrylic copolymer. Within this range, the metal chelate curing agent can provide additional effects without affecting effects of the adhesive film according to the present invention.

In an embodiment, the curing agent may be present in an amount of about 0.01 parts by weight to about 8 parts by weight, and, in an embodiment, 0.01, 0.05, 1, 2, 3, 4, 5, 6, 7, or 8 parts by weight, for example, about 0.01 parts by weight to about 3 parts by weight, and, in an embodiment, about 0.1 parts by weight to about 2 parts by weight, relative to 100 parts by weight of the (meth)acrylic copolymer.

Within this range, the adhesive composition can improve reliability of the adhesive film.

Aromatic Group-Containing Mono- or Higher Functional Monomer

The aromatic group-containing mono- or higher functional monomer has an aromatic group and at least one functional group that can be reacted by and an initiator. Here, "aromatic group" may refer to a group containing a $C_6$ to $C_{50}$ monocyclic or polycyclic ring. For example, the aromatic group may mean a substituted or unsubstituted, benzyl group, phenyl group, biphenyl group, terphenyl group, naphthalenyl group, and the like. In addition, "functional group" may refer to a vinyl group or a (meth)acrylate group and may be effective to prevent or substantially prevent excessive shrinkage of the adhesive film upon curing of the adhesive film through irradiation with light.

The aromatic group-containing mono- or higher functional monomer helps improve adhesive strength of the adhesive film by improving tackiness of an adhesive layer of the adhesive film with respect to a polyimide film through stacking effects by the π-π bond thereto. In addition, the aromatic group is a bulky substituent, as compared with a linear or branched alkyl group, and is inserted between a cured network structure of the (meth)acrylic copolymer and the curing agent, for example, between interpenetrating polymer networks (IPNs) or semi-IPNs, before irradiation with light, thereby suppressing excessive increase in initial peel strength of the adhesive film with respect to the adherend.

The aromatic group-containing mono- or higher functional monomer may improve cohesive strength and/or modulus of the adhesive film after irradiation with light. Accordingly, when the adhesive film adhered to a surface of an adherend is subjected to photocuring, the aromatic group-containing mono- or higher functional monomer allows the adhesive film to be adhered to the adherend with higher peel strength, thereby improving peel strength of the adhesive film.

It is desirable that a homopolymer of the aromatic group-containing mono- or higher functional monomer have a glass transition temperature in a certain range (e.g., a predetermined range), as compared with the glass transition temperature of the (meth)acrylic copolymer. As a result, even when the adhesive film is cured by irradiation with light, shrinkage of the adhesive film is suppressed to improve peel strength of the adhesive film after irradiation with light. In an embodiment, a homopolymer of the aromatic group-containing mono- or higher functional monomer has a higher glass transition temperature than the (meth)acrylic copolymer, and a difference in glass transition temperature between the aromatic group-containing mono- or higher functional monomer in a homopolymer phase and the (meth)acrylic copolymer may be about 20° C. or more, and, in an embodiment, 20° C., 25° C., 30° C., 35° C., 40° C., 45° C., 50° C., 55° C., 60° C., 65° C., 70° C., 75° C., 80° C., 85° C., 90° C., 95° C., 100° C., 110° C., 115° C., or 120° C., for example, about 20° C. to about 120° C., or about 40° C. to about 100° C. Within this range, the aromatic group-containing mono- or higher functional monomer can increase peel strength of the adhesive film after irradiation with light.

In an embodiment, the aromatic group-containing mono- or higher functional monomer may have a glass transition temperature of about −20° C. or more, and, in an embodiment, −30° C., −25° C., −20° C., −15° C., −10° C., −5° C., 0° C., 5° C., 10° C., 15° C., 20° C., 25° C., 30° C., 35° C., 40° C., 45° C., or 50° C., for example, about −20° C. to about 50° C. or about 5° C. to about 50° C., in a homopolymer phase. Within this range, the homopolymer of the aromatic group-containing mono- or higher functional monomer has a higher glass transition temperature than the (meth)acrylic copolymer, thereby securing increase in peel strength of the adhesive film through improvement in cohesive strength after irradiation with light.

The aromatic group-containing mono- or higher functional monomer may include a compound of the following Formula 1, without being limited thereto:

Formula 1

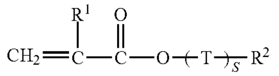

where $R^1$ is a hydrogen atom or a methyl group; s is an integer of 0 to 10; $R^2$ is a substituted or unsubstituted $C_6$ to $C_{50}$ aryl group or a substituted or unsubstituted $C_6$ to $C_{50}$ aryloxy group; and T is a substituted or unsubstituted $C_1$ to $C_6$ alkylene group or a substituted or unsubstituted $C_1$ to $C_6$ alkyleneoxy group.

Herein, in "substituted or unsubstituted," "substituted" means that at least one hydrogen atom is substituted with a $C_1$ to $C_{10}$ alkyl group, a $C_1$ to $C_{10}$ thio-alkyl group, a $C_1$ to $C_{10}$ alkoxy group, a halogen (F, Cl, Br or I), a $C_3$ to $C_{10}$ cycloalkyl group, or a $C_6$ to $C_{20}$ aryl group.

In an embodiment, $R^2$ may be a substituted or unsubstituted, phenoxy group, phenyl group, benzyl group, biphenyl group, ter-phenyl group, or naphthyl group. In an embodiment, the aromatic group-containing mono- or higher functional monomer may include at least one selected from the group consisting of phenoxy (meth)acrylate, phenoxy benzyl (meth)acrylate, 2-ethylphenoxy (meth)acrylate, benzyl (meth)acrylate, phenyl (meth)acrylate, 2-ethylthiophenyl (meth)acrylate, 2-phenylethyl (meth)acrylate, 3-phenylpropyl (meth)acrylate, 4-phenylbutyl (meth)acrylate, 2-(2-methylphenyl)ethyl (meth)acrylate, 2-(3-methylphenyl) ethyl (meth)acrylate, 2-(4-methylphenyl)ethyl (meth) acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl) ethyl (meth)acrylate, 2-(3-chlorophenyl)ethyl (meth) acrylate, 2-(4-chlorophenyl)ethyl (meth)acrylate, 2-(4-bromophenyl)ethyl (meth)acrylate, 2-(3-phenylphenyl)ethyl (meth)acrylate, ortho-biphenyl (meth)acrylate, meta-biphenyl (meth)acrylate, para-biphenyl (meth)acrylate, 2,6-terphenyl (meth)acrylate, ortho-terphenyl (meth)acrylate, meta-terphenyl (meth)acrylate, para-terphenyl (meth)acrylate, 4-(4-methylphenyl)phenyl (meth)acrylate, 4-(2-methylphenyl)phenyl (meth)acrylate, 2-(4-methylphenyl)phenyl (meth)acrylate, 2-(2-methylphenyl)phenyl (meth)acrylate, 4-(4-ethylphenyl)phenyl (meth)acrylate, 4-(2-ethylphenyl) phenyl (meth)acrylate, 2-(4-ethylphenyl)phenyl (meth)acrylate, 2-(2-ethylphenyl)phenyl (meth)acrylate, biphenylmethyl (meth)acrylate, naphthyl (meth)acrylate, ethoxylated phenyl (meth)acrylate, ethoxylated phenyl phenol (meth) acrylate, and mixtures thereof.

In an embodiment, the aromatic group-containing mono- or higher functional monomer may include at least one selected from among benzyl (meth)acrylate, ethylene glycol phenyl ether (meth)acrylate, ethoxylated phenyl acrylate (phenyl (EO)1 acrylate, phenyl (EO)2 acrylate), ethoxylated phenyl phenol acrylate (o-phenyl phenol (EO) acrylate), phenoxy benzyl acrylate, biphenyl methyl acrylate, and naphthyl acrylates including 1-naphthyl acrylate and the like.

In an embodiment, the aromatic group-containing mono- or higher functional monomer may be present in an amount of about 30 parts by weight to about 150 parts by weight, and, in an embodiment, 10, 15, 20, 25, 30, 35, 40, 45, 50, 55, 60, 65, 70, 75, 80, 85, 90, 95, 100, 105, 110, 115, 120, 125, 130, 135, 140, 145, or 150 parts by weight, for example, about 40 parts by weight to about 100 parts by weight, relative to 100 parts by weight of the (meth)acrylic copolymer. Within this range, the adhesive composition can assist in increase in peel strength of the adhesive film after irradiation with light and can suppress shrinkage of the adhesive film.

Initiator

The initiator serves to allow physical change of the adhesive film through irradiation with light by curing the aromatic group-containing mono- or higher functional monomer. The initiator may include at least one selected from among a photo-radical initiator and a photo-cationic initiator, and may further include a heat initiator.

In an embodiment, the initiator may include a photo initiator having a maximum absorption wavelength within an irradiation wavelength range applied to irradiation with light. For example, the photo initiator may have a maximum absorption wavelength in the wavelength range of about 280 nm to about 430 nm. Within this range, the initiator allows curing of the aromatic group-containing mono- or higher functional monomer through irradiation with light. In an embodiment, the photo initiator may include a phosphorus initiator, a ketone initiator, and the like, without being limited thereto.

In an embodiment, the initiator may be present in an amount of about 0.01 parts by weight to about 7.5 parts by weight, and, in an embodiment, about 0.03 parts by weight to about 4.5 parts by weight, relative to 100 parts by weight of the (meth)acrylic copolymer. Within this range, the initiator can secure uniform curing of the aromatic group-containing mono- or higher functional monomer through irradiation with light without deterioration in transparency of the adhesive film due to remaining initiator.

The adhesive composition may further include a curing accelerator.

The curing accelerator assists in curing reaction of the adhesive film to further improve cohesive strength of the adhesive layer. The curing accelerator may include a typical curing accelerator known to those skilled in the art. The curing accelerator may include any of a tin-based metal compound, a zinc metal compound, an amine compound, a titanium-based metal compound, a bismuth-based metal compound, and an aluminum-based metal compound. In an embodiment, among these compounds, a tin-based metal compound is used. For example, the curing accelerator may include tetravalent or divalent organotin-based compounds, such as dibutyl tin dilaurate, bis-acetyl acetonate-dibutyltin, dibutyl tin dimaleate, and dimaleate tin, without being limited thereto.

In an embodiment, the curing accelerator may be present in an amount of about 0.001 parts by weight to about 3 parts by weight relative to 100 parts by weight of the (meth) acrylic copolymer. Within this range, the curing accelerator can increase the curing rate of the adhesive film while improving cohesive strength of the adhesive film.

The adhesive composition may further include a silane coupling agent.

The silane coupling agent can further increase peel strength of the adhesive film. The silane coupling agent may include a typical silane coupling agent known to those skilled in the art. For example, the silane coupling agent may include any of epoxy group-containing silane coupling agents, such as glycidoxypropyltrimethoxysilane and glycidoxypropylmethyldimethoxysilane, without being limited thereto.

In an embodiment, the silane coupling agent may be present in an amount of about 0.01 parts by weight to about 5 parts by weight relative to 100 parts by weight of the (meth)acrylic copolymer. Within this range, the silane coupling agent can further improve peel strength of the adhesive film.

The adhesive composition may further include additives. The additives may include typical additives known to those skilled in the art. For example, the additives may include at least one selected from among pigments, UV absorbents, antioxidants, leveling agents, antistatic agents, retarders, and rework agents, without being limited thereto.

The adhesive composition may further include a solvent. The solvent can increase coatability of the adhesive composition to produce an adhesive film having a thin thickness and a uniform surface. The solvent may include typical solvents known to those skilled in the art. For example, the solvent may include any of methyl ethyl ketone, methyl isobutyl ketone, ethyl acetate, and toluene, without being limited thereto. In an embodiment, the adhesive composition may include the adhesive film in a solid content of 15 wt % to 40 wt %, and, in an embodiment, 20 wt % to 30 wt %. Within this range, the adhesive composition can exhibit good coatability.

In an embodiment, the adhesive film may have a haze of about 5% or less, and, in an embodiment, about 0.1% to about 2%, and a total luminous transmittance of about 80% or more, and, in an embodiment, about 85% to about 95%, in the visible spectrum (for example: in a wavelength range of 380 nm to 780 nm). Within this range, the adhesive film has good transparency to be used in an optical display apparatus.

In an embodiment, an adhesive layer of the adhesive film may have a thickness of about 200 μm or less, and, in an embodiment, greater than about 0 μm to about 100 μm, and, in an embodiment, about 5 μm to about 50 μm. Within this range, the adhesive film can act as a protective film for a flexible panel.

An optical member according to one or more embodiments of the present invention includes a flexible panel and an adhesive film formed on at least one surface of the flexible panel, wherein the adhesive film includes the adhesive film according to an embodiment of the present invention.

An optical member according to an embodiment of the present invention includes a flexible panel including a flexible substrate, an adhesive film stacked on a lower surface of the flexible substrate, and a protective film stacked on a lower surface of the adhesive film.

The optical member may include the flexible substrate, the adhesive film stacked on the lower surface of the flexible substrate, and the protective film stacked on the lower surface of the adhesive film. In an embodiment, the lower surface of the flexible substrate may be opposite to a direction in which light is emitted from the flexible panel.

The flexible substrate may serve to support an optical element, such as an organic light emitting diode and the like. The flexible substrate is a plastic film and may include, for example, a polyimide film, a polyester film, such as a polyethylene naphthalate film, a polyethylene terephthalate film, and the like, a polycarbonate film, a polyether sulfone film, and the like.

The protective layer may be formed of any suitable material so long as the protective layer is optically clear and can secure flexibility. For example, the protective layer may include a protective film including any of a polyester film, such as a polyethylene naphthalate film, a polyethylene terephthalate film, and the like, a polycarbonate film, a polyether sulfone film, and the like.

An optical element may be further stacked on an upper surface of the flexible substrate. The optical element provides optical functions, for example, light emission, polarization, optical compensation, display quality improvement, and/or conductivity, to a display apparatus. Examples of the optical element may include an OLED device, a window film, a window, a polarizing plate, a color filter, a retardation film, an elliptical polarizing film, a reflective polarizing film, an anti-reflection film, a compensation film, a brightness enhancing film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like.

The optical member may be manufactured through modification of a typical method known to those skilled in the art. For example, the optical member may be manufactured by preparing a flexible panel including a flexible substrate, bonding a laminate of an adhesive film and a protective layer to a lower surface of the flexible substrate, and bonding the laminate of the adhesive film and the protective layer to the flexible panel with high bonding strength through irradiation with light, when there is no defect, such as appearance abnormality or foreign matter, on the flexible substrate or the flexible panel. However, when there is no defect, such as appearance abnormality or foreign matter, on the flexible substrate or the flexible panel, the laminate of the adhesive film and the protective layer is removed from the flexible panel.

An optical display apparatus according to one or more embodiments of the present invention includes an adhesive film according to an embodiment of the present invention.

The optical display apparatus may include an organic light emitting diode display, a liquid crystal display, and the like. The optical display apparatus may include a flexible display. However, the optical display apparatus may include a non-flexible display.

Next, embodiments of the present invention will be described in further detail with reference to some examples. However, it should be understood that these examples are provided for illustration and should not be construed in any way as limiting the invention.

Preparative Example 1

Ethyl acetate was placed as a solvent in a 1 L reactor equipped with a cooler for easy temperature regulation under a nitrogen purging condition. 100 parts by weight of a monomer mixture including 85 mol % of n-butyl acrylate (BA), 10 mol % of methyl acrylate (MA), 4 mol % of 4-hydroxybutyl acrylate (4HBA) and 1 mol % of acrylic acid (AA) was added to the reactor. Oxygen was removed from the monomer mixture by supplying nitrogen gas to the monomer mixture for 30 minutes, followed by maintaining the reactor at 62° C. With the monomer mixture uniformly stirred, 0.08 parts by weight of an initiator (V-601, azo-based radical initiator, Wako Chemicals Co., Ltd.) was added thereto and reacted at 62° C. for 8 hours, thereby preparing a (meth)acrylic copolymer (weight average molecular weight: 1,298,112 g/mol, glass transition temperature: −50° C.). A (meth)acrylic copolymer solution (solid content: 30 wt %) was prepared by adding ethyl acetate as a solvent to the (meth)acrylic copolymer.

Preparative Examples 2 to 5

(Meth)acrylic copolymer solutions were prepared using the same method as in Preparative Example 1 except that the content of each monomer was changed as listed in Table 1 (unit: mol %).

TABLE 1

| Monomer | Preparative Example 1 | Preparative Example 2 | Preparative Example 3 | Preparative Example 4 | Preparative Example 5 |
|---|---|---|---|---|---|
| BA | 85 | 54 | 63 | 55 | 25 |
| MA | 10 | 41 | 35 | 40 | 70 |
| 4HBA | 4 | 3 | 2 | 5 | 4 |
| AA | 1 | 2 | 0 | 0 | 1 |
| Copolymer Mw (g/mol) | 1,298,112 | 1,001,829 | 662,091 | 998,032 | 1,001,630 |
| Copolymer Tg (° C.) | −50 | −31 | −21 | −30 | −11 |

Example 1

In terms of solid content, 100 parts by weight of the (meth)acrylic copolymer (Tg: −50° C.) prepared in Preparative Example 1, 0.5 parts by weight of an isocyanate curing agent (TD-75, Soken Co., Ltd.) and 0.3 parts by weight of an aluminum chelate curing agent (Hardener M-2, Saiden Co., Ltd.) as curing agents, 60 parts by weight of ethylene glycol phenyl ether acrylate (M-140, Miwon Specialty Chemical Co., Ltd., homopolymer Tg: 7° C.) as an aromatic group-containing mono-functional monomer, 0.5 parts by weight of an initiator (Irgacure TPO, phosphorus initiator, BASF), and 0.2 parts by weight of a curing accelerator (Accelerator S, tin-based curing accelerator, Soken Co., Ltd.) were added and diluted with methyl ethyl ketone, thereby preparing an adhesive composition (solid content: 25 wt %).

The prepared adhesive composition was coated to a thickness of 13 μm on a primer coating surface of a polyethylene terephthalate (PET) film as a base film (SKC, thickness: 75 μm, one surface subjected to urethane primer coating) and dried at 90° C. for 4 min. A release film (thickness: 25 μm, one surface subjected to silicone release treatment) was bonded to an adhesive layer and left at 50°

C. for 2 days, thereby preparing an adhesive film-containing sheet in which the adhesive film (thickness: 13 μm) and the release film are sequentially stacked on the base film.

Examples 2 to 8

Adhesive film-containing sheets were prepared using the same method as in Example 1 except that the kind and content of each component were changed as listed in Table 2.

Example 9

In terms of solid content, 100 parts by weight of the (meth)acrylic copolymer (Tg: −30° C.) prepared in Preparative Example 4, 0.5 parts by weight of an isocyanate curing agent (TD-75, Soken Co., Ltd.) and 0.5 parts by weight of an aluminum chelate curing agent (BXX-4805, Samyoung Ink Co., Ltd.) as curing agents, 60 parts by weight of ethylene glycol phenyl ether acrylate as an aromatic group-containing mono-functional monomer, and 0.5 parts by weight of an initiator (Irgacure TPO, phosphorus initiator, BASF) were added and diluted with methyl ethyl ketone, thereby preparing an adhesive composition (solid content: 25 wt %).

The prepared adhesive composition was coated to a thickness of 13 μm on a primer coating surface of a polyethylene terephthalate (PET) film as a base film (SKC, thickness: 75 μm, one surface subjected to urethane primer coating) and dried at 90° C. for 4 min. A release film (thickness: 25 μm, one surface subjected to silicone release treatment) was bonded to an adhesive layer and left at 50° C. for 3 days, thereby preparing an adhesive film-containing sheet in which the adhesive film (thickness: 13 μm) and the release film are sequentially stacked on the base film. Peel strength was measured using the sheet.

The prepared adhesive composition was coated to a thickness of 13 μm on a surface of a release film subjected to silicone release treatment (thickness: 75 μm, one surface subjected to silicone release treatment) as a base film and dried at 90° C. for 4 min. Then, a release film (thickness: 25 μm, one surface subjected to silicone release treatment) was bonded to an adhesive layer and left at 50° C. for 3 days, thereby preparing a non-carrier film (NCF) type adhesive sheet in which the adhesive layer is interposed between the two release films. A sample for measurement of modulus was prepared using the sheet.

Examples 10 to 12

Adhesive film-containing sheets were prepared using the same method as in Example 9 except that the kind and content of each component were changed as listed in Table 3.

Comparative Examples 1 to 5

Adhesive film-containing sheets were prepared using the same method as in Example 1 except that the kind and content of each component were changed as listed in Table 2.

Comparative Examples 6 to 8

Adhesive film-containing sheets were prepared using the same method as in Example 9 except that the kind and content of each component were changed as listed in Table 3.

Herein, among the components used in the Examples and Comparative Examples, the aromatic group-containing mono- or higher functional monomers were as follows.

Monomer A: Benzyl acrylate
Monomer B: Ethylene glycol phenyl ether acrylate
Monomer C: Phenoxy benzyl acrylate
Monomer D: Biphenyl methyl acrylate
Monomer E: 1-naphthyl acrylate
Monomer F: Methyl acrylate
Monomer G: n-butyl methacrylate
Monomer H: Stearyl methacrylate
Monomer I: Isobornyl acrylate
Monomer J: Lauryl acrylate Each of the adhesive film-containing sheets manufactured in the Examples and Comparative Examples was evaluated as to the following properties, and results are shown in Tables 2 and 3.

Figure 1B:
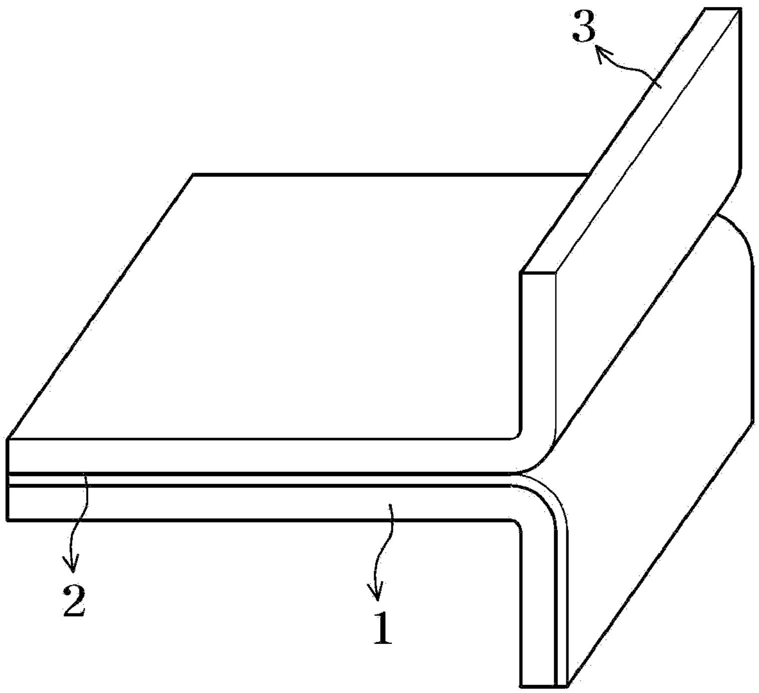
FIG. 1B is a view of the specimen in measurement of T-peel strength.

(1) Initial peel strength (P1, unit: gf/inch): The adhesive film was exposed by removing the release film from each of the adhesive film-containing sheets manufactured in the Examples and Comparative Examples. A polyimide film (GF200, thickness: 50 μm, SKC-KOLON) was adhered to the exposed surface of the adhesive film, compressed by a roller under a load of 2 kgf, and cut into a specimen having a size of 25 mm×100 mm (width×length). FIG. 1A shows the prepared specimen. Referring to FIG. 1A, a PET film 1, an adhesive film 2, and a polyimide film 3 are sequentially stacked. The specimen was left under conditions of 23±1° C. and 55±5% RH for 30 minutes. Peel strength was measured upon removal of the polyimide film from the adhesive film by a T-peel strength measurement method using a tensile tester (Texture analyzer, TA Industry Co., Ltd.) under conditions of peeling temperature: 25° C., peeling rate: 2,400 mm/min, and peeling angle: 180° in accordance with JISZ2037. T-peel strength may be measured with reference to FIG. 1B. T-peel strength refers to peel strength upon peeling off the polyimide film 3 from the PET film 1 and the adhesive film 2. T-peel strength was measured by pulling the polyimide film 3 in an arrow direction of FIG. 1B, with the PET film 1 and the adhesive film 2 secured to jigs of a TA instrument.

(2) Peel strength after UV irradiation (P2, unit: gf/inch): A specimen was prepared by sequentially stacking a PET film, an adhesive film, and a polyimide film using the same method as in (1). The specimen was irradiated at a PET film side thereof with UV light having a wavelength of 385 nm at a dose of 1,000 mJ/cm$^2$ using a UV LED irradiator (SUV-L5160A, UVSMT Co., Ltd.) and was left under conditions of 23±1° C. and 55±5% RH for 30 minutes. Then, peel strength was measured upon removal of the polyimide film from the adhesive film by a T-peel strength measurement method using a tensile tester (Texture analyzer, TA Industry Co., Ltd.) under conditions of peeling temperature: 25° C., peeling rate: 2,400 mm/min, and peeling angle: 180° in accordance with JISZ2037.

(3) Peel strength 7 days after attachment to adherend (P3, unit: gf/inch): The adhesive film was exposed at 23° C. and 50% RH by removing the release film from each of the adhesive film-containing sheets manufactured in the Examples and Comparative Examples. A polyimide film (GF200, thickness: 50 μm, SKC-KOLON) was attached to the exposed surface of the adhesive film, compressed by a roller under a load of 2 kgf, and cut into a specimen having a size of 25 mm×100 mm (width×length). The specimen was left under conditions of 23° C. and 50% RH for 7 days. Peel strength of the adhesive film was measured by removing the polyimide film from the adhesive film using the same method as in (1).

(4) Storage modulus (unit: kPa): Storage modulus of the adhesive film was measured at a shear rate of 1 rad/sec, at a strain of 1% and at a frequency of 1 Hz under auto strain conditions in a temperature sweep test mode using a rheometer (Anton Paar Co., Ltd.) as a dynamic viscoelasticity meter. Specifically, multiple adhesive films obtained from each of the adhesive film-containing sheets fabricated in the Examples and Comparative Examples were stacked to form a laminate having a thickness of 800 μm. Then, the laminate was punched using an 8 mm-diameter punching machine, thereby preparing a specimen. With a normal force of 3 N applied to the specimen using 8 mm jigs, storage modulus was measured at 25° C. on the specimen while heating the specimen from −50° C. to 100° C. at a heating rate of 5° C./min.

(5) Tg of UV monomer (aromatic group-containing mono- or higher functional monomer) in adhesive film (unit: ° C.): The adhesive film separated from the adhesive sheet of each of the Examples and Comparative Examples was irradiated with UV light at a wavelength of 385 nm and at a dose of 1,000 mJ/cm$^2$ using a UV LED lamp (SUV-L5160A, UVSMT). A portion of the adhesive film was scraped off and was used to measure Tg of the UV monomer by a differential scanning calorimeter (DSC 8000, Perkin Elmer Co., Ltd.).

(6) Wettability: The adhesive film-containing sheet prepared in each of the Examples and Comparative Examples was cut into a specimen having a size of 50 mm×100 mm. The specimen was left under conditions of 23° C. and 50% RH for 30 minutes and the release film was removed from the specimen to expose the adhesive film. Here, the specimen having the adhesive film attached to the PET film will be referred to as an adhesive tape. With both ends of the adhesive tape gripped by the hands, the center of the adhesive film was brought into contact with a glass plate and the hands were removed from the glass plate. Wettability was evaluated based on a time until the entirety of the adhesive tape was brought into close contact with the glass plate due to contact between the center of the adhesive tape and the glass plate. A shorter time for close contact with the glass plate indicates better affinity for the glass plate, which means that it is easier for the adhesive film to protect the glass plate in displays and display manufacturing processes using the glass plate.

○: Less than 3 seconds until close contact (excellent wettability)

Δ: 3 seconds to less than 5 seconds until close contact (good wettability)

X: 5 seconds or more until close contact (unusable)

TABLE 2

| | | Example 1 | Example 2 | Example 3 | Example 4 | Example 5 | Example 6 | Example 7 |
|---|---|---|---|---|---|---|---|---|
| (Meth)acrylic copolymer | Kind | Preparative Example 1 | Preparative Example 2 | Preparative Example 2 | Preparative Example 3 | Preparative Example 2 | Preparative Example 2 | Preparative Example 2 |
| | Content | 100 | 100 | 100 | 100 | 100 | 100 | 100 |
| Curing agent | Isocyanate-based | 0.5 | 0.5 | 0.5 | 0.5 | 0.5 | 0.5 | 0.5 |
| | Metal chelate-based | 0.3 | 0.3 | 0.3 | 0.3 | 0.3 | 0.3 | 0.3 |
| Mono- or higher functional monomer | Kind | Monomer B | Monomer B | Monomer B | Monomer B | Monomer A | Monomer C | Monomer D |
| | Tg (° C.) | 7 | 7 | 7 | 7 | 11 | 6 | 6 |
| | Content | 60 | 50 | 60 | 60 | 60 | 60 | 60 |
| Initiator | | 0.5 | 0.5 | 0.5 | 0.5 | 0.5 | 0.5 | 0.5 |
| Curing accelerator | | 0.2 | 0.2 | 0.2 | 0.2 | 0.2 | 0.2 | 0.2 |
| Peel strength | Initial | 59 | 68 | 56 | 63 | 63 | 58 | 61 |
| | After UV irradiation | 527 | 359 | 513 | 523 | 503 | 558 | 560 |
| | Peel strength increase rate of Equation 1 | 8.9 | 5.3 | 9.2 | 8.3 | 8.0 | 9.6 | 9.2 |

| | | Example 8 | Comparative Example 1 | Comparative Example 2 | Comparative Example 3 | Comparative Example 4 | Comparative Example 5 |
|---|---|---|---|---|---|---|---|
| (Meth)acrylic copolymer | Kind | Preparative Example 2 | Preparative Example 2 | Preparative Example 2 | Preparative Example 2 | Preparative Example 2 | Preparative Example 2 |
| | Content | 100 | 100 | 100 | 100 | 100 | 100 |
| Curing agent | Isocyanate-based | 0.5 | 0.5 | 0.5 | 0.5 | 0.5 | 0.5 |
| | Metal chelate-based | 0.3 | 0.3 | 0.3 | 0.3 | 0.3 | 0.3 |
| Mono- or higher functional monomer | Kind | Monomer E | Monomer F | Monomer G | Monomer H | Monomer I | Monomer J |
| | Tg (° C.) | 31 | 8 | 20 | 38 | 97 | −23 |
| | Content | 60 | 60 | 60 | 60 | 60 | 60 |
| Initiator | | 0.5 | 0.5 | 0.5 | 0.5 | 0.5 | 0.5 |
| Curing accelerator | | 0.2 | 0.2 | 0.2 | 0.2 | 0.2 | 0.2 |
| Peel strength | Initial | 65 | 52 | 63 | 62 | 137 | 50 |
| | After UV irradiation | 638 | 108 | 177 | 231 | 288 | 151 |

TABLE 2-continued

| | | | | | | | |
|---|---|---|---|---|---|---|---|
| | Peel strength increase rate of Equation 1 | 9.8 | 2.1 | 2.8 | 3.7 | 2.1 | 3.0 |

TABLE 3

| | | Example | | | | Comparative Example | | |
|---|---|---|---|---|---|---|---|---|
| | | 9 | 10 | 11 | 12 | 6 | 7 | 8 |
| (Meth)acrylic copolymer | Preparative Example 4 | 100 | 100 | 100 | 100 | 0 | 0 | 0 |
| | Preparative Example 5 | 0 | 0 | 0 | 0 | 100 | 100 | 100 |
| Aromatic group-containing mono- or higher functional monomer | Monomer B | 60 | 80 | 0 | 0 | 60 | 0 | 0 |
| | Monomer C | 0 | 0 | 60 | 0 | 0 | 60 | 0 |
| | Monomer E | 0 | 0 | 0 | 60 | 0 | 0 | 60 |
| Curing agent | Isocyanate-based | 0.5 | 0.5 | 0.5 | 0.5 | 1 | 1 | 1 |
| | Metal chelate-based | 0.5 | 0.5 | 0.5 | 0.5 | 1 | 1 | 1 |
| Initiator | | 0.5 | 0.5 | 0.5 | 0.5 | 0.5 | 0.5 | 0.5 |
| Initial peel strength | | 33 | 28 | 35 | 40 | 65 | 70 | 72 |
| Peel strength after UV irradiation | | 635 | 798 | 622 | 835 | 203 | 237 | 326 |
| Peel strength increase rate of Equation 1 | | 19.2 | 28.5 | 17.8 | 20.9 | 3.1 | 3.4 | 4.5 |
| Peel strength 7 days after attachment | | 51 | 37 | 54 | 57 | 166 | 189 | 221 |
| Peel strength increase rate of Equation 2 | | 0.5 | 0.3 | 0.5 | 0.4 | 1.6 | 1.7 | 2.1 |
| Storage modulus (kPa) | | 35 | 29 | 34 | 38 | 62 | 64 | 68 |
| Monomer Tg (° C.) | | 7 | 7 | 6 | 31 | 7 | 6 | 31 |
| Wettability | | ○ | ○ | ○ | ○ | X | X | X |

As shown in Tables 2 and 3, the adhesive films according to embodiments of the present invention had an initial peel strength of 100 gf/inch or less. Accordingly, although not shown in Table 2, the adhesive films could be easily removed from the adherend. The adhesive films according to embodiments of the present invention had a peel strength increase rate of 5.0 or more, as calculated by Equation 1. As such, although not shown in Table 2, since the adhesive films according to embodiments of the present invention had much higher peel strength than the adhesive films before irradiation with light, the adhesive film secured to the adherend could improve durability of an optical member including the adherend. Accordingly, the adhesive films according to embodiments of the present invention could be concurrently (e.g., simultaneously) used as a temporary protective film for processes with respect to a flexible panel substrate and as a protective film for pattern reinforcement, which is selectively partially removed to form patterns.

Accordingly, embodiments of the present invention provide an adhesive protective film that can be easily removed from an optical member after attachment of the adhesive film thereto and can be secured to the optical member through a process (e.g., a predetermined process). Further, embodiments of the present invention provide an adhesive film that can be adhered at low peel strength to an adherend to provide temporary protection to the adherend before irradiation with light and can be easily removed from the adherend without deformation and/or damage to the adherend through selective cutting of an unnecessary portion thereof. Further, embodiments of the present invention provide an adhesive protective film that exhibits significant increase in peel strength after irradiation with light, as compared with peel strength before irradiation with light, and is secured to an adherend to improve durability of an optical member including the adherend. Further, embodiments of the present invention provide an adhesive film that can be concurrently (e.g., simultaneously) used as a temporary protective film for processes with respect to a flexible OLED panel substrate and as a protective film for reinforcement of patterns, which is selectively partially peeled off to form patterns. Further, embodiments of the present invention provide an adhesive film that can be easily removed from an optical member due to a low peel strength increase rate even after a long period of time has elapsed after attachment of the adhesive film to the adherend. Further, embodiments of the present invention provide an adhesive film that has good wettability.

Conversely, the adhesive films of the Comparative Examples failing to satisfy the features of the present invention did not have the effects of the present invention.

It is to be understood that various modifications, changes, alterations, and equivalent embodiments can be made by those skilled in the art without departing from the spirit and scope of the present invention.

What is claimed is:

1. An adhesive film formed of an adhesive composition comprising a (meth)acrylic copolymer, a curing agent, an aromatic group-containing mono- or higher functional monomer, an initiator, and a curing accelerator, the adhesive film having a peel strength increase rate of 5.0 or more, as calculated by the following Equation 1:

$$\text{Peel strength increase rate}=P2/P1,$$

where P1 is an initial peel strength (unit: gf/inch) of the adhesive film with respect to an adherend, as measured on a specimen of the adhesive film and the adherend, and P2 is a peel strength of the adhesive film (unit: gf/inch) with respect to the adherend, as measured on the specimen of the adhesive film and the adherend after irradiation of the specimen with light, wherein the aromatic group-containing mono- or higher functional monomer comprises a compound of the following Formula 1:

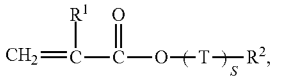

where $R^1$ is hydrogen or a methyl group; s is an integer of 0 to 10; $R^2$ is a substituted or unsubstituted $C_6$ to $C_{50}$ aryl group or an unsubstituted phenoxy group; and T is a substituted or unsubstituted $C_1$ to $C_6$ alkylene group or a substituted or unsubstituted $C_4$ to $C_6$ alkyleneoxy group, and wherein the adhesive film has a storage modulus of 50 kPa or less at 25° C. prior to being irradiated with light.

2. The adhesive film according to claim 1, wherein P1 is greater than 0 gf/inch and less than or equal to about 100 gf/inch.

3. The adhesive film according to claim 1, wherein P2 is about 300 gf/inch or more.

4. The adhesive film according to claim 1, wherein the adhesive film has a peel strength increase rate of 0.7 or less, as calculated by the following Equation 2:

$$\text{Peel strength increase rate}=(P3-P1)/P1,$$

where P1 is an initial peel strength (unit: gf/inch) of the adhesive film with respect to an adherend, as measured on a specimen of the adhesive film and the adherend, and P3 is a peel strength of the adhesive film (unit: gf/inch) with respect to the adherend, as measured on the specimen of the adhesive film and the adherend after the specimen is left at 25° C. and at 50% relative humidity for 7 days.

5. The adhesive film according to claim 1, wherein the aromatic group-containing mono- or higher functional monomer has a higher glass transition temperature in a homopolymer phase than the (meth)acrylic copolymer.

6. The adhesive film according to claim 1, wherein a difference in glass transition temperature between the aromatic group-containing mono- or higher functional monomer in a homopolymer phase and the (meth)acrylic copolymer is about 20° C. or more.

7. The adhesive film according to claim 1, wherein the aromatic group-containing mono- or higher functional monomer has a glass transition temperature of about −20° C. or more in a homopolymer phase.

8. The adhesive film according to claim 1, wherein the aromatic group-containing mono- or higher functional monomer is present in an amount of about 30 parts by weight to about 150 parts by weight relative to 100 parts by weight of the (meth)acrylic copolymer.

9. The adhesive film according to claim 1, wherein the (meth)acrylic copolymer has a glass transition temperature of about −10° C. or less.

10. The adhesive film according to claim 1, wherein the (meth)acrylic copolymer comprises a copolymer of a monomer mixture comprising an alkyl group-containing (meth)acrylic monomer and a hydroxyl group-containing (meth)acrylic monomer, the hydroxyl group-containing (meth)acrylic monomer being present in an amount of about 0.1 mol % to about 10 mol % in the monomer mixture.

11. The adhesive film according to claim 10, wherein the monomer mixture comprises a (meth)acrylic monomer having a glass transition temperature of about −80° C. or more in a homopolymer phase.

12. The adhesive film according to claim 10, wherein the monomer mixture further comprises a carboxylic acid group-containing monomer.

13. The adhesive film according to claim 1, wherein the curing agent comprises a mixture of an isocyanate curing agent and a metal chelate curing agent.

14. The adhesive film according to claim 1, wherein the initiator comprises at least one selected from among a photo-radical initiator and a photocationic initiator.

15. The adhesive film according to claim 1, wherein the adhesive composition comprises 100 parts by weight of the (meth)acrylic copolymer, about 0.01 parts by weight to about 8 parts by weight of the curing agent, about 30 parts by weight to about 150 parts by weight of the aromatic group-containing mono- or higher functional monomer, and about 0.03 parts by weight to about 7.5 parts by weight of the initiator.

16. An optical member comprising a flexible panel and an adhesive film stacked on at least one surface of the flexible panel, wherein the adhesive film comprises the adhesive film according to claim 1.

17. The optical member according to claim 16, comprising: the flexible panel comprising a flexible substrate, the adhesive film stacked on a lower surface of the flexible substrate, and a protective film stacked on a lower surface of the adhesive film.

18. An optical display apparatus comprising the adhesive film according to claim 1.

19. An adhesive film formed of an adhesive composition comprising a (meth)acrylic copolymer, a curing agent, an aromatic group-containing mono- or higher functional monomer, and an initiator, the adhesive film having an initial peel strength of greater than 0 gf/inch to about 100 gf/inch with respect to an adherend, as measured on a specimen of the adhesive film and the adherend, and a peel strength of 300 gf/inch or more with respect to the adherend, as measured on the specimen of the adhesive film and the adherend after irradiation of the specimen with light, wherein the aromatic group-containing mono- or higher functional monomer comprises a compound of the following Formula 1:

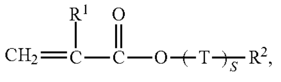

where $R^1$ is hydrogen or a methyl group; s is an integer of 0 to 10; $R^2$ is a substituted or unsubstituted $C_6$ to $C_{50}$ aryl group; and T is a substituted or unsubstituted $C_1$ to $C_6$ alkylene group or a substituted or unsubstituted $C_4$ to $C_6$ alkyleneoxy group, and wherein the adhesive film has a storage modulus of 50 kPa or less at 25° C. prior to being irradiated with light.

* * * * *